US008805735B1

(12) United States Patent
Goldberg et al.

(10) Patent No.: US 8,805,735 B1
(45) Date of Patent: Aug. 12, 2014

(54) SYSTEM AND METHOD FOR DETERMINING MODEL CREDIT DEFAULT SWAP SPREADS (75) Inventors: Lisa R. Goldberg, Kensington, CA (US); Rajnish Kamat, Oakland, CA (US); Vijay Poduri, San Ramon, CA (US)

(73) Assignee: Morgan Stanley Capital International, Inc., New York, NY (US)

( * ) Notice: Subject to any disclaimer, the term of this patent is extended or adjusted under 35 U.S.C. 154(b) by 2114 days.

(21) Appl. No.: 11/825,718

(22) Filed: Jul. 9, 2007

Related U.S. Application Data (60) Provisional application No. 60/833,566, filed on Jul. 27, 2006.

(51) Int. Cl.
G06Q 40/00 (2012.01)

(52) U.S. Cl.
USPC .............................. 705/38; 705/35; 705/36 R (58) Field of Classification Search
USPC .......................................................... 705/37
See application file for complete search history.

(56) References Cited

U.S. PATENT DOCUMENTS

| | | | | |
|---|---|---|---|---|
| 6,021,397 | A * | 2/2000 | Jones et al. ................. | 705/36 R |
| 7,225,174 | B2 | 5/2007 | Schreckengast et al. | |
| 7,792,730 | B2 * | 9/2010 | Kastel et al. ............... | 705/36 R |
| 2001/0042785 | A1 * | 11/2001 | Walker et al. ............... | 235/379 |
| 2003/0110016 | A1 * | 6/2003 | Stefek et al. ................ | 703/2 |
| 2003/0149657 | A1 | 8/2003 | Reynolds et al. | |
| 2004/0054572 | A1 | 3/2004 | Oldale et al. | |
| 2004/0117302 | A1 * | 6/2004 | Weichert et al. ............. | 705/40 |
| 2004/0225598 | A1 | 11/2004 | Goldberg et al. | |
| 2005/0209959 | A1 | 9/2005 | Tenney | |
| 2005/0234792 | A1 * | 10/2005 | Gagnon et al. .............. | 705/36 |
| 2006/0143099 | A1 * | 6/2006 | Partlow et al. .............. | 705/35 |

OTHER PUBLICATIONS

Merton, "On the Pricing of Corporate Debt: The Risk Structure of Interest Rates," Journal of Finance, 29:449-470 (1974).
Black et al., "Valuing Corporate Securities: Some Effects of Bond Indenture Provisions," Journal of Finance, 31:351-367 (1976).
Longstaff et al., "A Simple Approach to Valuing Risky Fixed and Floating Rate Debt," Journal of Finance, 50(3):789-819 (1995).
Leland, "Corporate Debt Value, Bond Covenants, and Optimal Capital Structure," Journal of Finance, 49(4): 1213-1252 (1994).
Giesecke et al., "Forecasting Default in the Face of Uncertainty," Journal of Derivatives, 12(1):1-15 (2004).
Eom et al., "Structural Models of Corporate Bond Pricing: An Empirical Analysis," Review of Fincancial Studies, 17:499-544 (2004).
U.S. Appl. No. 11/355,160, filed Feb. 14, 2006.

(Continued)

Primary Examiner — Olabode Akintola
Assistant Examiner — Kellie Campbell
(74) Attorney, Agent, or Firm — K&L Gates LLP (57) ABSTRACT A system and method of determining a model default swap spread for a firm which includes the following steps: (i) determining a calibration group of the firm, wherein the calibration group comprises other firms having a region, a sector and a coarse quality related to the firm; (ii) setting firm leverage variables through combining observable data with a value of at least one model parameter; (iii) calibrating variables based on the calibration group; (iv) calculating the model default swap spread based on at least one of calibration variables; and (v) storing the model default swap spread.

23 Claims, 3 Drawing Sheets (56) References Cited

OTHER PUBLICATIONS

Murphy, Kevin, "A Brief Introduction to Graphical Models and Bayesian Networks", dated 1998, Webpage accessed from http://www.ai.mit.edu/~murphyk/Bayes/bayes.html, Nov. 1, 2004.

Li, David X., "On Default Correlation: A Copula Function Approach", dated Apr. 2000, Webpage accessed from http://defaultrisk.com/pp_corr_05.htm, Mar. 4, 2005.

Hull, John, and White, Alan, "The Valuation of Credit Default Swap Options", dated Jan. 2003, Webpage accessed from http://defaultrisk.com/pp_crdrv_27.htm, Mar. 4, 2005.

"Bayes's Theorem", dated Jun. 28, 2003, Webpage accessed from http://plato.stanford.edu/entries/bayes-theorem, Sep. 22, 2003.

Garcia, Joao; Gielens, Geert; Leonard, Luc; and Van Gestel, Tony, "Pricing Baskets Using Gaussian Copula and BET Methodology: a Market Test", dated Jun. 23, 2003, Webpage accessed from http://defaultrisk.com/pp_crdrv_35.htm, Mar. 4, 2005.

Yu, Fan, "Correlated Defaults and the Valuation of Defaultable Securities", dated May 2004, Webpage accessed from http://www.moodyskmv.com/conf04/pdfpresentations/yu_corr_def_and_val.pdf, Feb. 24, 2005.

Giesecke, Kay and Goldberg, Lisa R., "The Market Price of Credit Risk", dated Sep. 23, 2003, revised Sep. 23, 2004.

Giesecke, Kay, "Credit Risk Modeling and Valuation: An Introduction", dated Oct. 24, 2004, Webpage accessed from http://defaultrisk.com/pp_model_38.htm, Mar. 4, 2005.

Malevergne, Yannick and Somette, Didier, "Testing the Gaussian Copula Hypothesis for Financial Assets Dependencies", Webpage accessed from http://www.papers.ssrn.com/sol3/papers.cfm?abstract_id=291140I, Mar. 7, 2005.

Bertsimas, D., Lauprete, G.J. and A. Samarov, "Shortfall as a Risk Measure: Properties, Optimization and Application". Journal of Economic Dynamic & Control, 28 (2004), 1353-1381.

Danielsson, J:, de Hann, L., Peng, L. and C. G. de Vries, "Using a Bootstrap Method to Choose the Sample Fraction in Tail Index Estimation". Econometric Institute Report EI 2000-19/A.

Duffie, D. and J. Pan, "An Overview of Value at Risk". The Journal of Derivatives, Spring 1997.

Fernandez, V., "Extreme Value Theory and Value at Risk", Revista de Análisis Económico, vol. 18, No. 1, pp. 57-83 (2003).

Heyde, C.C. and Kou, S. G., "On the Controversy Over Tailweight of Distributions". Operations Research Letters 32 (2004), pp. 399-408.

McNeil, A. and Frey, R. (2000). "Estimation of Tail-Related Risk Measures for Heteroscedastic Financial Series: An Extreme Value Approach". Journal of Empirical Finance, 7 (3-4), pp. 271-300.

Niederhausen, H., "Scheffer Polynomials for Computing Exact Kolomogrov-Smirnov and Rényi Type Distributions". The Annals of Statistics, vol. 9, No. 5 (1981), pp. 923-944.

Chakravarti, Laha and Roy (1967), Handbook of Methods of Applied Statistics, vol. I, John Wiley and Sons, pp. 392-411, Chapter 8.

U.S. Appl. No. 11/789,318, filed Apr. 24, 2007.

U.S. Appl. No. 11/581,501, filed Oct. 16, 2006.

U.S. Appl. No. 10/994,832, filed Nov. 22, 2004.

Office Action issued on Mar. 24, 2008 in U.S. Appl. No. 10/994,832.

Office Action issued on Dec. 15, 2008 in U.S. Appl. No. 10/994,832.

\* cited by examiner

SYSTEM AND METHOD FOR DETERMINING MODEL CREDIT DEFAULT SWAP SPREADS

CROSS-REFERENCE TO RELATED APPLICATION

The present application claims priority to U.S. provisional patent application Ser. No. 60/833,566, filed Jul. 27, 2006, which is incorporated herein by reference.

BACKGROUND

Credit markets are being transformed at a phenomenal pace with transacted notional amounts in credit derivatives reaching new heights every year. The British Bankers' Associates has estimated the size of this market to be currently around $24.0 trillion. Credit default swap indices have brought a level of standardization to the securities they comprise. This facilitates analysis that relates credit spreads to observable information in equity markets, which offer a transparent and liquid source of information.

The link between equity markets and credit spreads is well developed under many structural models. Numerous models have been developed, including those described in: Robert C. Merton, *On the Pricing of Corporate Debt: The Risk Structure of Interest Rates*, Journal of Finance, 29:449-470 (1974); Fischer Black and John C. Cox, *Valuing Corporate Securities: Some Effects of Bond Indenture Provisions*, Journal of Finance, 31:351-367 (1976); Hayne E. Leland, *Corporate Debt Value, Bond Covenants, and Optimal Capital Structure*, Journal of Finance, 49(4):1213-1252 (1994); and others. However, empirical studies such as Young Ho Eom, Jean Helwege and Jingzhi Huang, *Structural Models of Corporate Bond Pricing: An Empirical Analysis*, Review of Financial Studies, 17:499-544 (2004) conclude that a significant mismatch between the model and the market remains.

An important metric often associated with many of the structural models is distance to default, which is the volatility normalized difference between a firm's value and its liabilities. Distance to default is a coarse measure of creditworthiness and is often widely used to rank firms and forecast credit events. However, distance to default alone does not explain credit default swap spreads. Many structural models may be misaligned due to the fact that they are often driven by a single factor.

SUMMARY OF THE INVENTION

In one general aspect, the present invention is directed to systems and method for determining a model default swap spread for a firm (sometimes referred to as a "credit"). According to various embodiments, the firm is pooled in a calibration group with other firms of similar geographic region, industry, and coarse quality (e.g., a rating quality indicator). The process comprises regressing default swap spreads from the firm onto (i) an $I^2$ default probability forecast, (ii) the region, (iii) the industry sector, and (iv) the coarse quality. Then the firm leverage variables, including expected firm leverage ($\mu_L$), the variance of the firm leverage ($\sigma_L^2$), and the largest possible value for firm leverage L ($\max_L$), may be set through combining observable data with a value of at least one model parameter, such as parsimonious model parameter. The firm leverage variable ($\mu_L$, $\sigma_L^2$, $\max_L$) and the firm value variables (e.g., value (V) and firm volatility ($\sigma_v$)) may then be calibrated using the calibration group. The model default swap spread may then be calculated. Also, the model default swap spread may be subtracted from the actual default swap spread for the firm.

In various implementations, the firm value variables (V and $\sigma_v$) may be calibrated by performing one or more inversion steps to update the variable for the firm until convergence. In addition, the firm leverage variable ($\mu_L$, $\sigma_L^2$, $\max_L$) may be calibrated by performing one or more minimization steps to update the firm leverage variables until convergence.

Using certain embodiments, improved alignment between model and market default swap spreads can be achieved. The model default swap spreads can be used for credit investment applications such as relative value assessment and portfolio construction, cross-market hedging, pricing of illiquid names and monitoring for suspicious credits. These and other benefits obtainable with embodiments of the present invention will be apparent from the description below.

BRIEF DESCRIPTION OF THE FIGURES

Embodiments of the present invention are described herein by way of example in conjunction with the following figures, wherein.

DETAILED DESCRIPTION OF THE INVENTION

Figure 1:
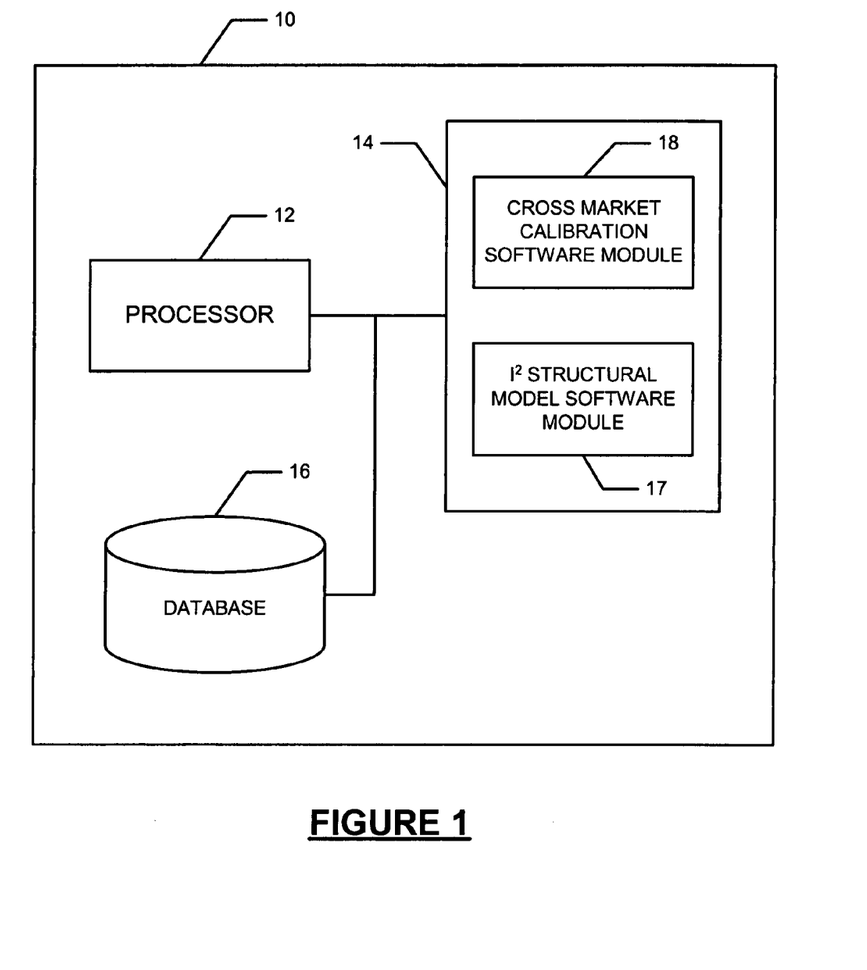
FIG. 1 depicts a computer system according to one embodiment of the present invention.

As shown in FIG. 1, one embodiment of the present invention may comprise a computer system 10 that calculates a model default swap spread for a firm (or "credit") based on variables calibrated across a number of factors relevant to the firm. The system 10 can also calculate the difference between the actual default swap spread for the firm and the model default swap spread. The computer system may comprise one or more processors 12 in communication with a memory 14 and a database 16 storing data which may include data relating to firm value, firm leverage and other financial data. The memory 14 may comprise an $I^2$ structural model software module 17 and a cross-market calibration software module 18. When the processor 12 executes the code of the $I^2$ structural model software module 17, the processor 12 may be caused to determine (or estimate) firm value and firm leverage, as described further below. When the processor 12 executes the code of the cross-market calibration software module 18, the processor 12 may be caused to determine the model spread for the firm, as described further below. The model spread may be stored in the database 16 or some other storage unit associated with the computer system 10.

The computer system 10 may comprise one or a number of networked personal computers, laptops, mainframe computers, servers, workstations, or any other suitable computing devices. The memory 14 may be any suitable type of computer-readable medium, such as, for example, random access memory (RAM), read-only memory (ROM), a magnetic medium, such as a hard drive or floppy disk, or an optical medium, such as a CD-ROM. The modules 17, 18 may be implemented as software code to be executed by the processor(s) 12 using any suitable computer language. The software code may be stored as a series of instructions or commands in the memory 14.

In various embodiments, the default swap market may be analyzed using a two factor $I^2$ structural model, driven by firm value and firm leverage. More details regarding the $I^2$ structural model are described by Kay Giesecke and Lisa Goldberg, in *Forecasting Default in the Face of Uncertainty, Journal of Derivatives,* 12(1):1-15 (2004) and in U.S. Provisional Patent Application No. 60/652,756, filed Feb. 14, 2005, which are incorporated herein by reference. The $I^2$ structural model may be a first passage model with an unobservable default barrier. The unobservable default barrier may be economically motivated, in that investors who are not firm insiders do not know the level of firm value that will trigger bankruptcy. Default may occur when firm value falls below a threshold amount, or the unobservable default barrier D, or equivalently, when normalized firm value falls below the firm leverage $$L = \frac{D}{V}.$$

Given the minimum of firm value on [0,T], $M_T$, the probability of default on the horizon [0,T] may be represented by:

$$P\left(\frac{M_T}{V} < L\right) = \int \Psi_T(L) dF(L)$$

where F is the cumulative distribution function of the effective leverage and $\Psi_T(x)$ is the first passage probability that $M_T/V \leq x$.

In the $I^2$ structural model, firm value may evolve according to geometric Brownian motion whose volatility is denoted by $\sigma$. According to various embodiments, risk premium will not be evaluated, rather the riskless interest, r, may be used, which is assumed to be constant. The firm value at time t $V_t$ may satisfy the stochastic differential equation:

$$\frac{dV_t}{V_t} = \mu dt + \sigma dW.$$

where W is a Brownian motion scaled by $\sigma$ and which may describe the risk associated with firm value. It follows that $V_t$ is lognormally distributed so that:

$$V_t = V e^{\left(\mu - \frac{\sigma^2}{2}\right)t + \sigma W_t}.$$

In this situation, the first passage probability $\Psi_T$ may be given by:

$$\Psi_T(L) = \Phi\left(\frac{L - \mu T}{\sigma \sqrt{T}}\right) + \exp\left(\frac{2\mu L}{\sigma^2}\right) \Phi\left(\frac{L + \mu T}{\sigma \sqrt{T}}\right)$$

where $\Phi$ denotes the normal probability distribution, and $\mu$ denotes drift which may be set to the riskless rate r.

In various embodiments, the distribution F of firm leverage may be a scaled beta distribution. A standard beta distribution on the interval [0,1] may be specified by:

$$F_{\alpha,\beta}(x) = C(\alpha,\beta) \int_0^x u^{\alpha-1}(1-u)^{\beta-1} du$$

where $C(\alpha,\beta)$ is a normalizing constant and u is an integrand associated with the probability distribution. (For example, see Robert V. Hogg and Allen T. Craig, *Introduction to Mathematical Statistics,* Prentice Hall, Upper Saddle River, N.J. (5th Ed., 1995) at page 180.) The class of beta distributions may provide a flexible array of shapes obtained by varying parameters $\alpha$ and $\beta$. The firm leverage distribution F may be obtained by rescaling $F_{\alpha,\beta}$ to the interval $[0, \max_L]$ where $\max_L$ is the largest possible value for the firm leverage L. $\max_L \leq 1$ and equality may occur when the maximum possible default barrier is equal to V.

The firm leverage distribution parameters $\alpha$ and $\beta$ may be expressed in terms of expected value $\mu_L$ and variance $\sigma_L^2$ and may be represented by:

$$\alpha = \frac{\mu_L(1 - \mu_L - \sigma_L^2)}{\sigma_L^2}$$

and $$\beta = \frac{(1 - \mu_L)(1 - \mu_L - \sigma_L^2)}{\sigma_L^2}.$$

In various embodiments, an expected firm leverage $\mu_L$ may be a component of distance to expected default, which is one factor in the $I^2$ structural model. Another risk factor may be variance $\sigma_L^2$ of firm leverage, which is an indication of investor uncertainty about the true value of firm leverage. The variance $\sigma_L^2$ of firm leverage may be set to be a function of expected firm leverage $\mu_L$. For example, a firm whose expected firm leverage $\mu_L$ is relatively low so that its book liabilities are small compared to firm value may also have leverage uncertainty which is relatively small, and a firm with relatively high expected leverage, which has likely fallen below the book value of its liabilities, may also have small leverage uncertainty. Firms with mid-level expected leverage may have the most latitude. This economic picture may correspond to a quadratic bound on leverage variance in terms of expected leverage that arises in a scaled beta distribution, $$\sigma_L^2 < \mu_L(1 - \mu_L),$$

and this bound may be used as a guide to setting the variance.

At any horizon T, a distance $d_{ted}$ to the expected default barrier $D = \mu_L V$ may be given by:

$$d_{ted} = \frac{\log(V/D) + (r - \sigma_V^2/2)T}{\sigma_V \sqrt{T}}$$

This quantity may give a crude but informative ranking of firms by credit worthiness from the perspective of equity markets. In the $I^2$ structural model, $d_{ted}$ may determine a cohort of firms whose default probabilities are distinguished by uncertainty around firm leverage.

Figure 2:
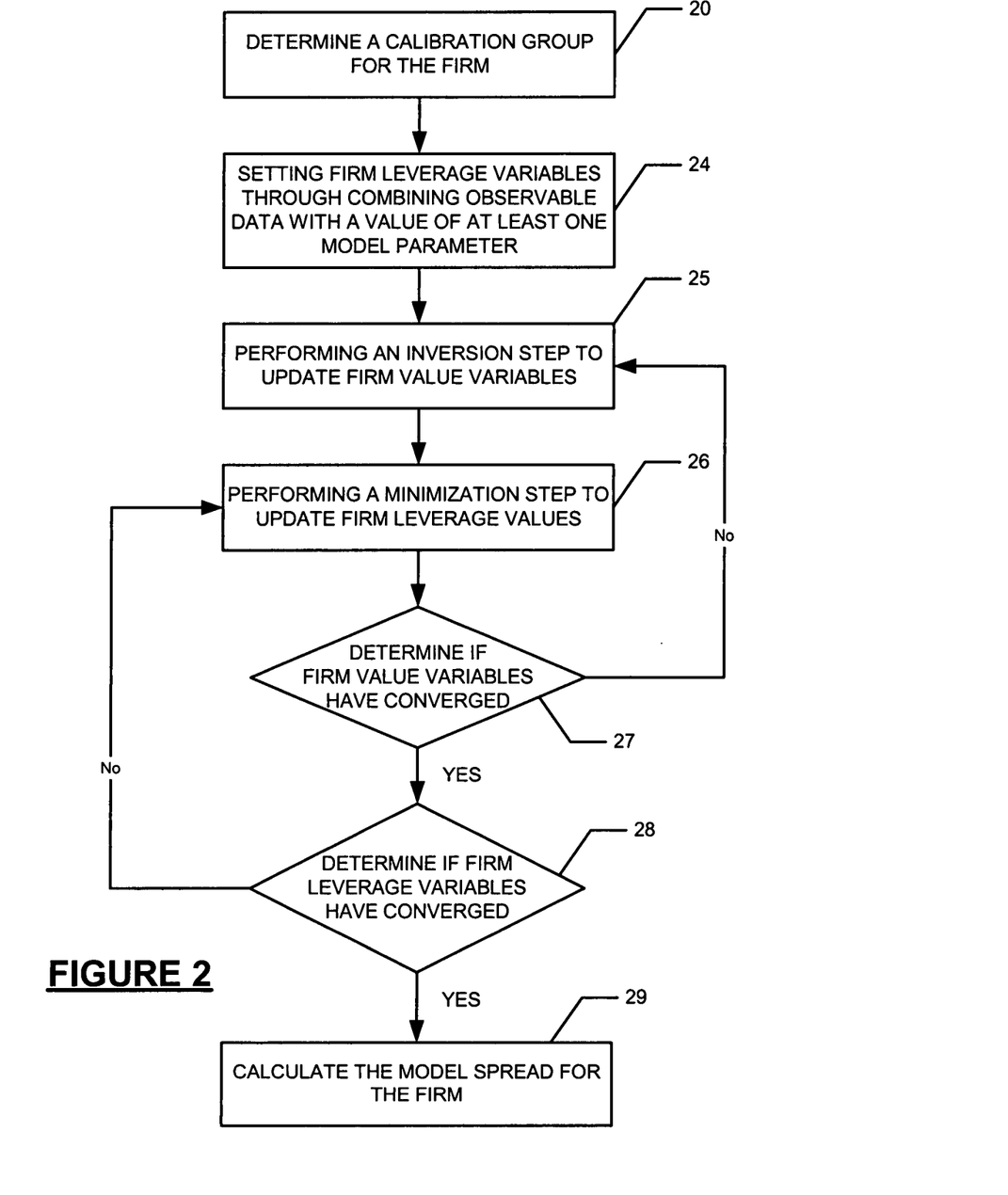
FIG. 2 is a flowchart illustrating the steps taken in determining the model spread for a firm in one embodiment of the present invention.

FIG. 2 is a flowchart illustrating a process for determining the model default swap spread for a firm according to various embodiments of the present invention. As shown in FIG. 2, the $I^2$ structural model may be calibrated simultaneously to the equity and default swap markets. First, at step 20, a calibration group for a firm may be determined. The calibration group may comprise other firms having: (i) a region indicator (e.g., United States, North America, the European Union ("EU"), the United Kingdom ("UK") and EU/UK, etc.); (ii) a rating, or coarse, quality indicator (e.g., investment grade, high yield, not rated); and (iii) a sector indicator (e.g., one of the Global Industry Classification Standard ten sector classifications ("GICS"), Industry Classification Benchmark ("ICB") classifications, North American Industry Classification System (NAICS) classifications and Standard Industrial Classification ("SIC") classifications) which may be related to the firm. This calibration may be accomplished through a two-step procedure referred to as the inversion-minimization algorithm. The $I^2$ structural model may be calibrated to equity and balance sheet data, and to further align with the credit default swap market. Using a cross-market calibration, $I^2$ can be reconciled to the credit default swap market.

According to various embodiments, a parsimonious model C may be constructed that expresses the credit default swap of a firm in terms of name-specific variables and other market data. The model C may consist of parameters that are shared by the members of each calibration group which may consist of $\mu_L$, $\sigma_L^2$ and $\max_L$. For a fixed constant recovery rate R, a model spread $S_{I^2}$ may be given by:

$$S_{I^2} = s(V, \sigma_V, \mu_L, \max_L, r; R, C)$$

which may be calculated by matching a value of a swap leg making fixed payments at a rate of $S_{I^2}$ to an expected value of losses due to default.

An objective function O may be calculated using the difference between a market spread and the model spread. The objective function may be represented by:

$$O = \Sigma \epsilon (S - S_{I^2})$$

where S is the market spread and a sum is taken over all firms in a calibration group and $\epsilon$ is a bounded influence estimator that reduces the weight of outliers relative to a least squares minimization. For each calibration group, at step 24, observable data may be combined with an initial guess of model parameters in C to set the firm leverage variables $\mu_L$, $\sigma_L^2$ and $\max_L$. Then the inversion step (step 25) and the minimization step (step 26) for each firm should be repeated until convergence, as shown in steps 25-28. Finally, at step 29, the model spread may be calculated.

In various embodiments, at step 25, firm value V and volatility $\sigma_V$ may be calibrated through the use of an inversion step. Firm value V and volatility $\sigma_V$ may be calibrated under the assumption that equity is a perpetual barrier call option on firm value with a fixed default barrier D, so that $$E = V - D\left(\frac{D}{V}\right)^{\gamma}$$

where $$\gamma = \frac{2r}{\sigma_V^2}$$

Applying Ito's Lemma yields:

$$E\sigma_E = \frac{\partial V}{\partial E} V \tilde{\sigma}_V$$

Values for V and $\sigma_V$ may be obtained by inverting the formulas for E and $E\sigma_E$. This inverse problem may not be well posed. A convenient formulation may be in terms of the equity normalized default barrier $$d = \frac{D}{E}$$

Given values of equity E>0, equity volatility $\sigma_E$>0, and the riskless rate r>0, there is a limit $d_{max} = d_{max}(\sigma_E, r) > 0$ that makes the inverse problem well posed. For example, there may be unique values for initial firm value V and firm volatility $\sigma_V$ if $d \leq d_{max}$. A perpetual down-and-out option may result in a shift of the entire data set towards the origin. This may leave smaller differences between model and market to be explained by the $I^2$ framework. The number of outliers may also be reduced as the barrier option does not suffer from problems associated with models of the prior art where high leverage firms calibrate to unreasonably low asset volatilities and therefore have similar distance to expected default as less risky firms.

Figure 3:
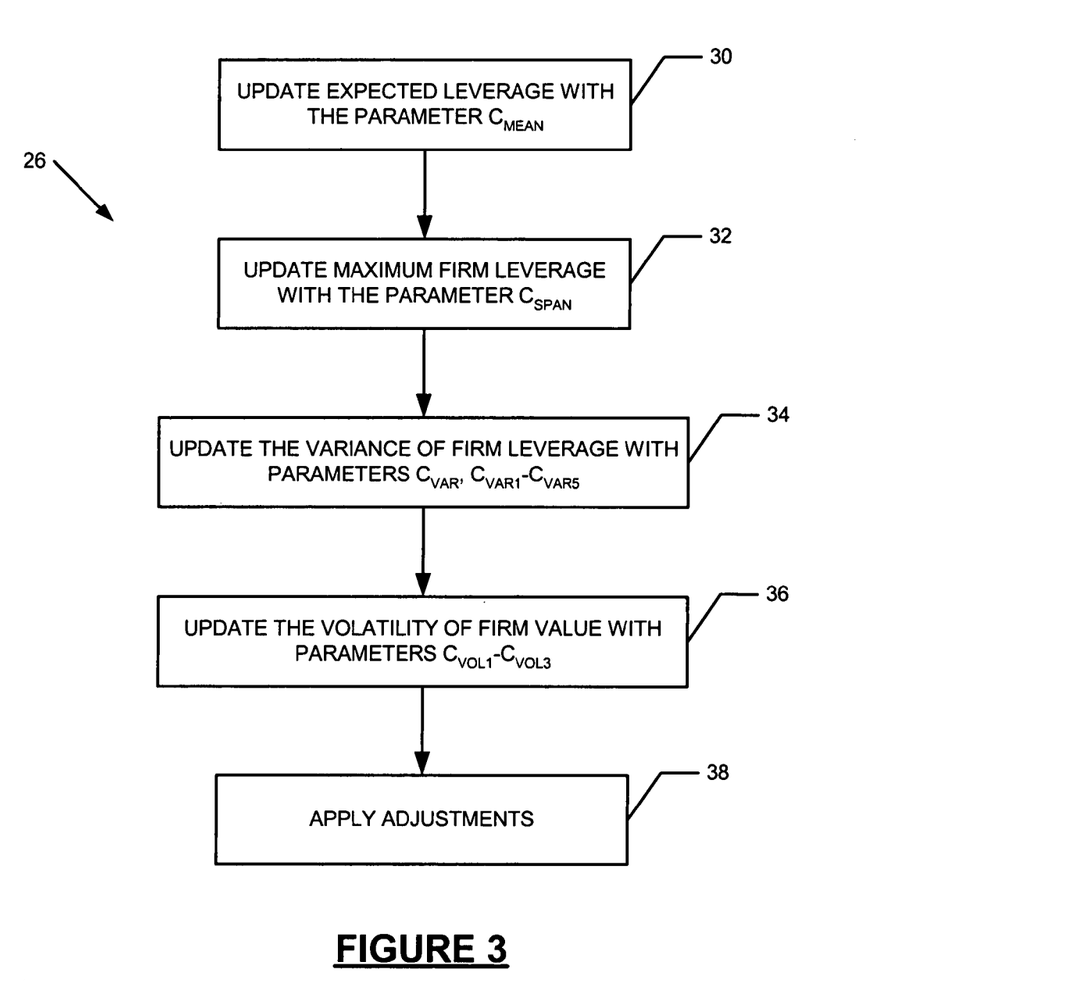
FIG. 3 is a flowchart illustrating the steps taken in performing a minimization step in one embodiment of the present invention.

In various embodiments, parameters of the firm leverage distribution may be set in terms of a combination of idiosyncratic information and model parameters in C. At step 26, firm leverage variables $\mu_L$, $\sigma_L^2$ and $\max_L$ and firm volatility $\sigma_V$ may be updated by performing a minimization step. FIG. 3 is a flowchart illustrating a process for performing the minimization process of step 26 of FIG. 2 according to various embodiments. One part of the minimization step may be to update firm leverage $\mu_L$ with a model parameter $c_{mean}$, as shown in step 30 of FIG. 3. In a preliminary step, a level of liabilities may be set for each firm from balance sheet and off balance sheet data:

$$D_{init} = 0.5 D_S + 0.5 D_u + 0.6 D_L$$

where $D_S$ is short-term debt, $D_U$ is unsecured long-term debt and $D_L$ is secured long-term debt. Long-term debt may include operating leases and pension plan shortfalls. An initial estimate $D_{init}$ of the default barrier D is an important ingredient to the relative ordering by expected leverage $$L = \frac{D}{V}$$

among firms in each calibration group.

An initial estimate of an equity normalized default barrier may be set such that $$d_{init} = \frac{D_{init}}{E}.$$

This estimate may be lacking in multiple ways. For example, it may exceed a limit imposed above where $d_{init} > d_{max}$ so that it is impossible to find compatible values of V and $\sigma_V$; additionally, even if $d_{init} \leq d_{max}$ so the inverse problem is well posed, the initial estimate may not reflect the relative importance of leverage as a determinant of credit spreads. This importance may vary over time and by calibration group.

In a second step, the parameter $c_{mean}$ may be used to adjust spacing between the values of d within each calibration group. The parameter $c_{mean}$ may adjust the initial level of equity normalized liabilities $d_{init}$ for all firms in the calibration group simultaneously. The equity normalized liabilities may be set to:

$$d = d_{init}(1 - N(\delta_1)) + d_{max} N(\delta_2) = d_{max} - (d_{max} N(-\delta 2) - d_{init} N(-\delta 1))$$

where N may be a standard normal cumulative probability function and $$\delta_1 = \frac{\log(d_{init}/d_{max}) + 0.5c_{mean}^2}{c_{mean}}$$

and $$\delta_2 = \delta_1 - c_{mean}$$

The parameter $c_{mean}$ may play the role of volatility in a value of a put option that is subtracted from the maximum level of equity normalized liabilities $d_{max}$. An increase in $c_{mean}$ may tend to cluster the equity normalized liabilities while preserving their order. This increase may also affect leverage $$L = \frac{D}{V}$$

in the same way.

In various embodiments, given an estimate of equity normalized liabilities d, the expected value of the firm leverage distribution may be set as:

$$\mu_L = \frac{dE}{V}$$

The level of parameter $c_{mean}$ may be inversely related to the importance of distance to expected default in determining market spreads. This importance may also vary over time and by calibration group.

In another part of the minimization step, shown at step 32, maximum firm leverage $max_L$ may be updated with a model parameter $c_{span}$. The model parameter $c_{span}$ may set an upper support of the firm leverage distribution as follows:

$$max_L = \frac{1}{1 + c_{span}(1 - \mu_L)}$$

The parameter $c_{span} \in [0.5, 1]$ may be restricted so that $$max_L \in [1/(1.5 - 0.5\mu_L), 1/(2 - \mu_L)]$$

The lower bound $c_{span} = 0.5$ may bound $max_L$ away from 1. This may lead to upward-sloping model term structures that are compatible empirical observations for most cases. The upper bound $c_{span} = 1$ may bound $max_L$ away from $\mu_L$. This may prevent numerical instability caused by a nearly degenerate firm distribution.

Continuing with the minimization step, at step 34, the variance of firm leverage $\sigma_L^2$ may be updated with model parameters $c_{var}$ and $c_{var1}$-$c_{var5}$. In various embodiments, the quadratic bound $$\sigma_L^2 \leq \mu_L(1 - \mu_L)$$

inherent in the scaled beta distribution may be a guide to setting the variance $\sigma_L^2$ for credits in a calibration group. However, flexibility may need to be added in order to fit the empirical distribution of credit default swap spreads in the group. Firm leverage variance may be given by $$\sigma_L^2 = c_{var} \upsilon_1 \upsilon_2 \upsilon_3 \mu_L (1 - \mu_L)$$

where $c_{var} \in (0, 0.6]$ may set the overall level of firm volatility as a function of the bound and adjustments $\upsilon_i$, which are discussed below, depend on model parameters, the firm-specific variables $\mu_L$ and $d_{ted}$, and term T.

In various embodiments, at step 36, the volatility of firm value $\sigma_V$ may be updated with model parameters $c_{vol1}$-$c_{vol3}$. During periods of high volatility, certain industries or coarse quality cohorts may be affected by credit events to a larger extent than the broad sector to which they belong. Contagion and momentum indices may be used to track this phenomenon and make appropriate adjustments to firm volatility. An additional adjustment that depends on term and expected firm leverage may be used to refine the shape of the term structure. The value of firm volatility used in the calculation of I² model spreads is:

$$\sigma_V = \omega_1 \omega_2 \omega_3 \tilde{\sigma}_V$$

where $\tilde{\sigma}_V$ is the value of firm volatility obtained from the inversion step and $\omega_1$, $\omega_2$ and $\omega_3$ are adjustment factors which are discussed below.

At step 38, various adjustments may be applied. In various embodiments, adjustments $\upsilon_1$, $\upsilon_2$, $\upsilon_3$, $\omega_1$, $\omega_2$ and $\omega_3$ may regulate the impact of firm leverage, distance to expected default, and term on leverage variance and, therefore, on model spreads. The firm leverage variance is given by:

$$\sigma_L^2 = c_{var} \upsilon_1(\mu_L) \upsilon_2(d_{ted}) \upsilon_3(T, d_{ted}) \mu_L(1 - \mu_L)$$

The quadratic bound may be symmetric about the value $\mu_L = \frac{1}{2}$ and the function $$\upsilon_1 = (1 + 0.5(1 - \tanh(c_{var1}\mu_L)))\tanh\left(\frac{1 - \mu_L}{.15 c_{var2}}\right)$$

which may supply the latitude required to account for an asymmetric relationship between the variance of firm leverage and its expected value. Larger values of parameters $c_{var1}$ and $c_{var2}$ may reduce the sensitivity of model spreads relative to a quadratic specification of firm leverage variance.

The credit default swap spread for a firm with good credit may not drop as rapidly as a function of distance to expected default as is predicted by a standard structural model. An adjustment $$\upsilon_2 = 1 + 100 c_{var3} \exp(c_{var4} d_{ted})$$

may be used which controls the effect of distance to expected default $d_{ted}$ on barrier variance. Larger values of the model parameters $c_{var3}$ and $c_{var4}$ may increase spreads for firms with large values of $d_{ted}$ relative to those with small values of $d_{ted}$. For example, for a fixed value of expected firm leverage, firms with larger $d_{ted}$ have higher firm leverage variance.

According to various embodiments, market default swap term structures may be upward sloping for non-distressed firms. For high-quality firms, a term independent variance may produce term structures that are flatter than those observed in the market. To compensate, firm leverage variance may be adjusted by:

$$\upsilon_3 = \left(\frac{T}{10}\right)^\gamma, \gamma = \frac{c_{var5}}{1 + 500\exp(-2.5 d_{ted})}$$

which may take account of both term T and $d_{ted}$. The effect of term on firm variance may need to be tempered for credits with a smaller distance to effective default as they calibrate with a smaller variance due to adjustment $\upsilon_2$.

Structural models may not produce an upward-sloping term structure for longer maturities, but rather one with a hump, with spreads flat to decreasing over a time period (e.g., 7-10 years). For example, one reason for this may be that the equity volatility forecast used in the calibration has a medium term horizon while credits are evaluated with a higher volatility for long maturities. The firm volatility $\sigma_V$ generated by the inversion step may be scaled by the function $$\omega_1 = 1 + \frac{c_{vol1}}{(1 + 150\exp(-(T-5)))(1 + \exp(-5(\mu_L - 0.5)))}$$

which depends on term T and expected leverage $\mu_L$. The effect of term on firm volatility may be lower for firms with relatively high expected leverage $\mu_L$.

During periods of high volatility, in various embodiments, contagion and momentum effects on credit default swap spreads may be pronounced. Equity return data may be introduced to refine the distinction between firms within a calibration group. This may result in an overall lowering of model errors. Contagion risk indices $I_C$ may be used to identify industries with recent downturns in the equity market. For example, for each industry, $I_C$ may be the minimum of 0 and an exponentially weighted average of 60 daily industry common factor returns. The half-life of the weighting scheme may be 60 days, for example. Momentum risk indices $I_M$ may be used to identify firms affected by negative equity returns. For example, the momentum risk indices may be defined analogously to the contagion risk indices, by using an equity-specific return in place of the industry common factor return. In certain embodiments, total return may be used in place of specific return. Errors may tend to be positive for negative values of both the contagion and momentum risk indices.

In various embodiments, parameters $c_{vol2}$ and $c_{vol3}$ may control the impact of the contagion and momentum risk indices on firm value volatility through the following adjustments:

$$\omega_2 = 1 + \frac{c_{vol2}}{1 + 100\exp(66(I_c + 1.01))}$$

$$\omega_3 = 1 + \frac{c_{vol3}}{1 + 50\exp(10(I_M + 0.03))}$$

In volatile periods, values of $I_c$ and $I_M$ may become more negative. The contagion and momentum parameters $c_{vol2}$ and $c_{vol3}$ may increase. This may raise the level of firm value volatility for the corresponding firms.

The calibration may minimize the objective function $$O = \Sigma \epsilon(S - S_{\hat{f}}^2)$$

where S is the market spread. Since relative large errors are more prevalent than predicted by a normal distribution, a Huber bounded influence error estimator may be used where the function $\epsilon$ is defined by:

$$\varepsilon(x) = \begin{cases} x^2/2 & |x| \le k \\ k(|x| - k/2) & |x| > k \end{cases}$$

For example, a standard setting may be k=1.345 s where s may be an estimate of the standard deviation of the errors. If the errors were normally distributed, this choice of k may result in an estimator with 95% asymptotic efficiency.

According to various embodiments, s may be set to 30 basis points for investment grade credits and 100 basis points for high-yield credits.

In various embodiments, the Levenberg-Marquardt algorithm, which is a hybrid between steepest descent and Newton's method, may be used as a minimization algorithm. Spread values from the most recent successful calibration may be used as seed values in the minimization algorithm. The grouping scheme described above may use observables other than the default swap spreads, and thus may allow classification of a larger group of firms than those firms used in an estimation universe. Model spreads for firms outside the estimation universe may be generated by using the corresponding parameter set for the group (i.e., by region, sector and coarse quality). For example, for unrated firms in the U.S. and high-yield names in EU/UK, there may not be enough default swap spread data; therefore, corresponding high-yield and unrated parameter sets may be used to produce spreads in this case.

The default swap spread quotes used in the calibration may be obtained from various sources (e.g., Credit Market Analysis based in London) and may be stored in the database 16. Firms with large discontinuities or spikes over a time period (e.g., the past 20 trading days) may be dropped from the estimation universe. In addition, firms may be dropped if the firm's leverage ratio exceeds a threshold amount (e.g., 2000). Additional screenings may also be applied. For example, firms outside the financial sector whose spread to firm leverage ratio is less than 50 may also be dropped. Only firms for which data have been available for the two previous calibration dates may be included in the current estimation universe.

Several applications may be found for the present invention. Investors may use the output from this model to monitor the holdings in their portfolios to either actively make decisions about trading firms in their portfolio or simply to keep track of what is happening to their portfolio. Other applications may include the application of hedging strategies and short-term risk assessment models.

While several embodiments of the invention have been described, it should be apparent, however, that various modifications, alterations and adaptations to those embodiments may occur to persons skilled in the art with the attainment of some or all of the advantages of the present invention. For example, various steps in the processes illustrated in FIGS. 2 and 3 may be performed in different order or simultaneously. It is therefore intended to cover all such modifications, alterations and adaptations without departing from the scope and spirit of the present invention as defined by the appended claims.

What is claimed is:

1. A method of determining a model default swap spread for a firm comprising:
    determining, by a computer system, a calibration group of the firm, wherein the calibration group comprises other firms having a region, a sector and a coarse quality related to the firm, wherein the computer system comprises at least one processor;
    setting, by the computer system, firm leverage variables $\mu_L$, $\sigma_L^2$ and $\max_L$ through combining observable data with a value of at least one model parameter, wherein $\mu_L$ is the expected firm leverage, $\sigma_L^2$ is the variance of the firm leverage, and $\max_L$ is the largest possible value for firm leverage L;
    calibrating, by the computer system, variables $\mu_L$, $\sigma_L^2$, $\max_L$, and firm value variables V and $\sigma_V$ based on the calibration group;

calculating, by the computer system, the model default swap spread based on at least one of calibration variables $\mu_L$, $\sigma_L^2$, $\max_L$, V and $\sigma_V$; and storing the model default swap spread in a database of the computer system.

2. The method of claim 1, wherein the region is a geographic region.

3. The method of claim 2, wherein the geographic region is at least one of the United States, North America, the European Union ("EU"), the United Kingdom ("UK") and EU/UK.

4. The method of claim 1, wherein the sector comprises an industry classification.

5. The method of claim 1, wherein the at least one model parameter is a model parameter in a parsimonious model.

6. The method of claim 1, wherein calibrating V and $\sigma_V$ comprises performing one or more inversion steps to update V and $\sigma_V$ for the firm until convergence.

7. The method of claim 6, wherein calibrating $\mu_L$, $\sigma_L^2$ and $\max_L$ comprises performing one or more minimization steps to update $\mu_L$, $\sigma_L^2$, and $\max_L$ until convergence.

8. The method of claim 7, further comprising determining, by the computer system, the difference between the market default swap spread for the firm and the model default swap spread for the firm.

9. A non-transitory computer readable medium having instructions stored thereon which, when executed by a processor, cause the processor to determine a model default swap spread for a firm by:

determining a calibration group of the firm, wherein the calibration group comprises other firms having a region, a sector and a coarse quality related to the firm;

setting firm leverage variables $\mu_L$, $\sigma_L^2$ and $\max_L$ through combining observable data with a value of at least one model parameter, wherein $\mu_L$ is the expected firm leverage, $\sigma_L^2$ is the variance of the firm leverage, and $\max_L$ is the largest possible value for firm leverage L;

calibrating variables $\mu_L$, $\sigma_L^2$, $\max_L$, and firm value variables V and $\sigma_V$ based on the calibration group; and calculating the model default swap spread based on at least one of calibration variables $\mu_L$, $\sigma_L^2$, $\max_L$, V and $\sigma_V$.

10. The computer readable medium of claim 9, wherein the at least one model parameter is a model parameter in a parsimonious model.

11. The computer readable medium of claim 9, wherein calibrating V and $\sigma_V$ comprises performing one or more inversion steps to update V and $\sigma_V$ for the firm until convergence.

12. The computer readable medium of claim 11, wherein calibrating $\mu_L$, $\sigma_L^2$, and $\max_L$ comprises performing one or more minimization steps to update $\mu_L$, $\sigma_L^2$, and $\max_L$ until convergence.

13. The computer readable medium of claim 12, having further stored thereon instructions, which when executed by the processor, cause the processor to determine the difference between the market default swap spread for the firm and the model default swap spread for the firm.

14. A system for determining a model default swap spread for a firm comprising:

a processor; and a memory in communication with the processor, wherein the memory stores instructions which when executed by the processor causes the processor to determine a model default swap spread for a firm by:

determining a calibration group of the firm, wherein the calibration group comprises other firms having a region, a sector and a coarse quality related to the firm;

setting firm leverage variables $\mu_L$, $\sigma_L^2$ and $\max_L$ through combining observable data with a value of at least one model parameter, wherein $\mu_L$ is the expected firm leverage, $\sigma_L^2$ is the variance of the firm leverage, and $\max_L$ is the largest possible value for firm leverage L;

calibrating variables $\mu_L$, $\sigma_L^2$, $\max_L$, and firm value variables V and $\sigma_V$ based on the calibration group; and calculating the model default swap spread based on at least one of calibration variables $\mu_L$, $\sigma_L^2$, $\max_L$, V and $\sigma_V$.

15. The system of claim 14, wherein the at least one model parameter is a model parameter in a parsimonious model.

16. The system of claim 14, wherein calibrating V and $\sigma_V$ comprises performing one or more inversion steps to update V and $\sigma_V$ for the firm until convergence.

17. The system of claim 16, wherein calibrating $\mu_L$, $\sigma_L^2$, and $\max_L$ comprises performing one or more minimization steps to update $\mu_L$, $\sigma_L^2$, and $\max_L$ until convergence.

18. The system of claim 17, having further stored thereon instructions, which when executed by the processor, cause the processor to determine the difference between the market default swap spread for the firm and the model default swap spread for the firm.

19. A system for determining an implied default swap spread for a firm comprising:

a processor; and a database in communication with the processor, wherein the database stores data regarding firm value and firm leverage, and wherein the processor is programmed to determine an implied default swap spread for a firm by:

determining a calibration group of the firm, wherein the calibration group comprises other firms having a region, a sector and a coarse quality related to the firm;

setting firm leverage variables $\mu_L$, $\sigma_L^2$ and $\max_L$ through combining observable data with a value of at least one model parameter, wherein $\mu_L$ is the expected firm leverage, $\sigma_L^2$ is the variance of the firm leverage, and $\max_L$ is the largest possible value for firm leverage L;

calibrating variables $\mu_L$, $\sigma_L^2$, $\max_L$, and firm value variables V and $\sigma_V$ based on the calibration group; and calculating the model default swap spread based on at least one of the calibration variables $\mu_L$, $\sigma_L^2$, $\max_L$, V and $\sigma_V$.

20. The system of claim 19, wherein the at least one model parameter is a model parameter in a parsimonious model.

21. The system of claim 19, wherein calibrating V and $\sigma_V$ comprises performing one or more inversion steps to update V and $\sigma_V$ for the firm until convergence.

22. The system of claim 21, wherein calibrating $\mu_L$, $\sigma_L^2$ and $\max_L$ comprises performing one or more minimization steps to update $\mu_L$, $\sigma_L^2$, and $\max_L$ until convergence.

23. The system of claim 22, having further stored thereon instructions which, when executed by the processor, cause the processor to determine the difference between the market default swap spread for the firm and the model default swap spread for the firm.

* * * * *